US012787983B1

(12) United States Patent
Cifers, III et al.

(10) Patent No.: US 12,787,983 B1
(45) Date of Patent: Nov. 10, 2026

(54) FISH MEASURING DEVICE

(71) Applicant: YakAttack LLC, Farmville, VA (US)

(72) Inventors: Luther Cifers, III, Farmville, VA (US); David H. Martin, Prospect, VA (US)

(73) Assignee: YakAttack LLC, Farmville, VA (US)

( * ) Notice: Subject to any disclaimer, the term of this patent is extended or adjusted under 35 U.S.C. 154(b) by 277 days.

(21) Appl. No.: 18/786,450

(22) Filed: Jul. 27, 2024

Related U.S. Application Data

(60) Provisional application No. 63/636,369, filed on Apr. 19, 2024.

(51) Int. Cl.
*G01B 3/04* (2006.01)
*A01K 29/00* (2006.01)
*A01K 99/00* (2006.01)

(52) U.S. Cl.
CPC ................ *A01K 29/00* (2013.01); *G01B 3/04* (2013.01); *A01K 99/00* (2013.01)

(58) Field of Classification Search
CPC ........... A01K 29/00; A01K 99/00; G01B 3/04
See application file for complete search history.

(56) References Cited

U.S. PATENT DOCUMENTS 5,339,532 A * 8/1994 O'Keefe ................ A01K 61/90 D10/70
5,526,575 A * 6/1996 Hoover .................... G01B 3/02 33/549
5,637,838 A * 6/1997 Arey ........................ G01B 3/08 177/4
6,415,521 B1 * 7/2002 Schnell .................. A01K 97/00 33/549
6,765,155 B1 * 7/2004 Gray ...................... G01G 19/60 33/549
6,959,499 B2 * 11/2005 Bini ....................... A01K 97/00 33/511
7,191,536 B1 * 3/2007 Bailey .................... A01K 61/90 33/549
10,598,474 B1 * 3/2020 Petrash .................. G01B 3/002
11,357,222 B2 * 6/2022 Weskamp ................ G01B 3/06

(Continued)

FOREIGN PATENT DOCUMENTS

CN 209279837 U * 8/2019
KR 20250161803 A * 11/2025 ............... G01B 5/02

*Primary Examiner* — Yaritza Guadalupe-Mccall
(74) *Attorney, Agent, or Firm* — Thedford I. Hitaffer; Hitaffer, PLLC

(57) ABSTRACT

A fish measuring device comprises an elongated board, for supporting a fish. A fence is provided at one end of the board for placement of an end of the fish. The board carries indica for measuring the length of the fish. With the mouth of the fish placed against the fence, the indicia facilitates the measurement of the distance from the fence to the tail of the fish. To ensure accuracy of this measurement, a reference feature is provided on the fence. In one embodiment, the reference feature is a reflective surface, which shows a gap between the fence and the fish when the fish is not in contact with the fence. In another embodiment, the reference feature is in the form of a series of vertically spaced, horizontal lines. When the fish is not against the fence, lines beneath the mouth of the fish will be visible, representing a gap between the mouth and the fence.

5 Claims, 4 Drawing Sheets

(56) References Cited

U.S. PATENT DOCUMENTS

| | | | | |
|---|---|---|---|---|
| 11,733,017 | B2 * | 8/2023 | Weskamp | G01B 3/08 33/511 |
| 12,590,789 | B2 * | 3/2026 | Crawford | A01K 99/00 |
| 2004/0163267 | A1 * | 8/2004 | Bini | A01K 97/00 33/511 |
| 2012/0324751 | A1 * | 12/2012 | Wakeman | A01K 97/00 33/759 |
| 2017/0000099 | A1 * | 1/2017 | Wanke | A01K 97/00 |
| 2026/0009630 | A1 * | 1/2026 | Garner | G01B 5/02 |

* cited by examiner

FISH MEASURING DEVICE

BACKGROUND

The present invention relates to a measuring device, and more particularly, to a device for measuring fish, particularly the length of fish in fishing tournaments.

Accurately measuring fish in a fishing tournament can be difficult, particularly on small vessels, like kayaks and the like. Fish measuring boards are used to hold fish while being measured. Such boards carry a scale to facilitate measurement of the length of fish. In a tournament, a competitor (i.e., sports fisherman) captures an image of the fish on the fish measuring board, and transmits the same to a remote location, where there is a leaderboard for tracking, real time, the leader of the tournament. However, there remains some level of inaccuracy, which may even encourage dishonesty, when measuring fish, for example, when capturing an image of a fish at an angle. Depending on the vantage point, when capturing an image at an angle, the fish may appear to be longer or shorter than its actual length.

What is needed is a fish measuring device that measures fish accurately and reliably.

SUMMARY OF THE INVENTION

The present invention is a device for measuring fish. The device may be in the form of an elongated board, which may be cusped along a length thereof to form an elongated trench that extends in a lengthwise direction for supporting a fish. A fence may be provided at one end of the board for placement of an end of the fish, such as the mouth. The board carries indica in the form of a scale of measurement for accurately and reliably measuring the length of the fish. With the mouth placed against the fence, the scale facilitates the measurement of the distance from the fence (i.e., the mouth of the fish) to the tail of the fish. This represents the length of the fish. To ensure accuracy of this measurement, a reference feature is provided on the fence. In one embodiment, the reference feature may be in the form of a reflective surface (e.g., mirror decal), which shows a gap between the fence and the mouth of the fish when the mouth is not in contact with the fence. In another embodiment, the reference feature may be in the form of a series of vertically spaced, horizontal lines. When the mouth of the fish is not against the fence, lines beneath the mouth of the fish will be visible, representing a gap between the mouth and the fence. In either instance, the gap would provide indication that the fish is not against the fence, which would exaggerate the length of the fish.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the fish measuring device will become more fully appreciated when considered in view of the accompanying drawings, in which like reference characters designate the same or similar parts and/or features throughout the several views, and wherein.

DETAILED DESCRIPTION OF THE PREFERRED EMBODIMENT

In light of the aforementioned figures, and in accordance with the adopted numbering, one may observe therein an example of a preferred embodiment of the invention, which comprises the parts and elements indicated and described in detail below.

Figure 1:
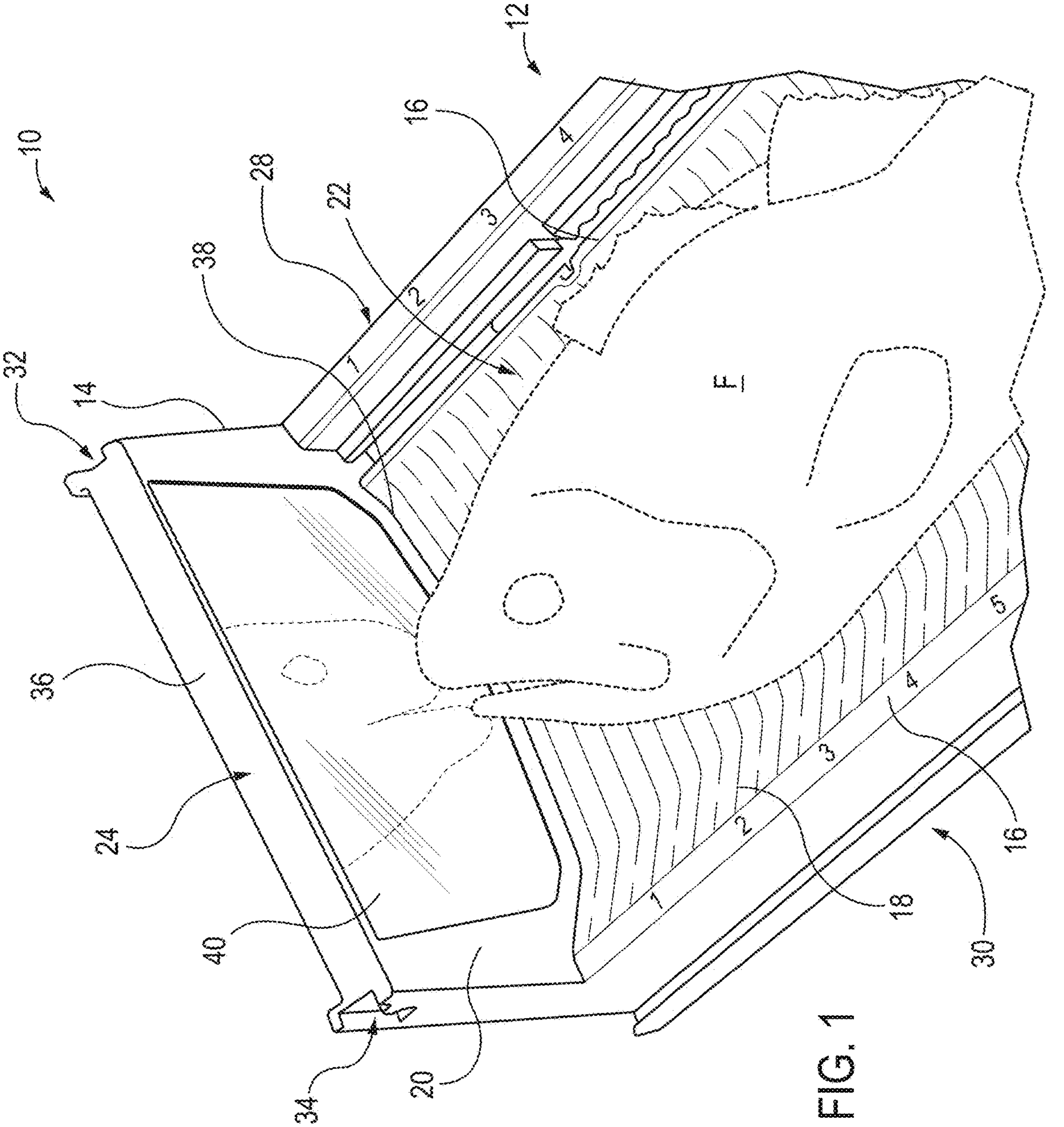
FIG. 1 is an environmental top perspective view of an exemplary fish measuring device, shown in relevant part, with a mouth of a fish directly in contact with a reference feature supported by a fence to indicated that the fish is in fact in contact with the fence.
Figure 2:
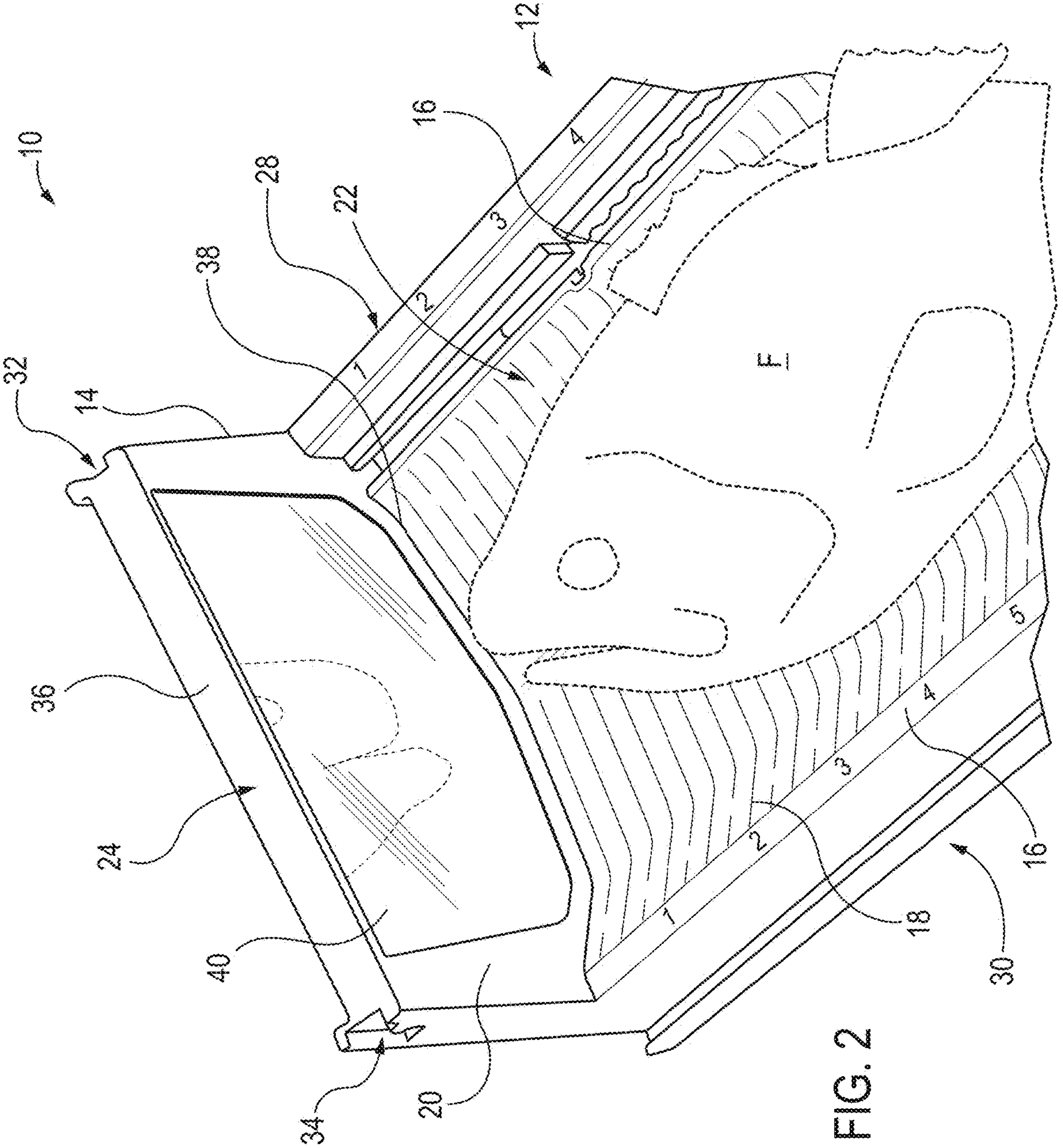
FIG. 2 is an environmental top perspective view of the fish measuring device shown in FIG. 1, showing a mouth of a fish out of contact with the reference feature to indicate that the fish is not in contact with the fence.
Figure 3:
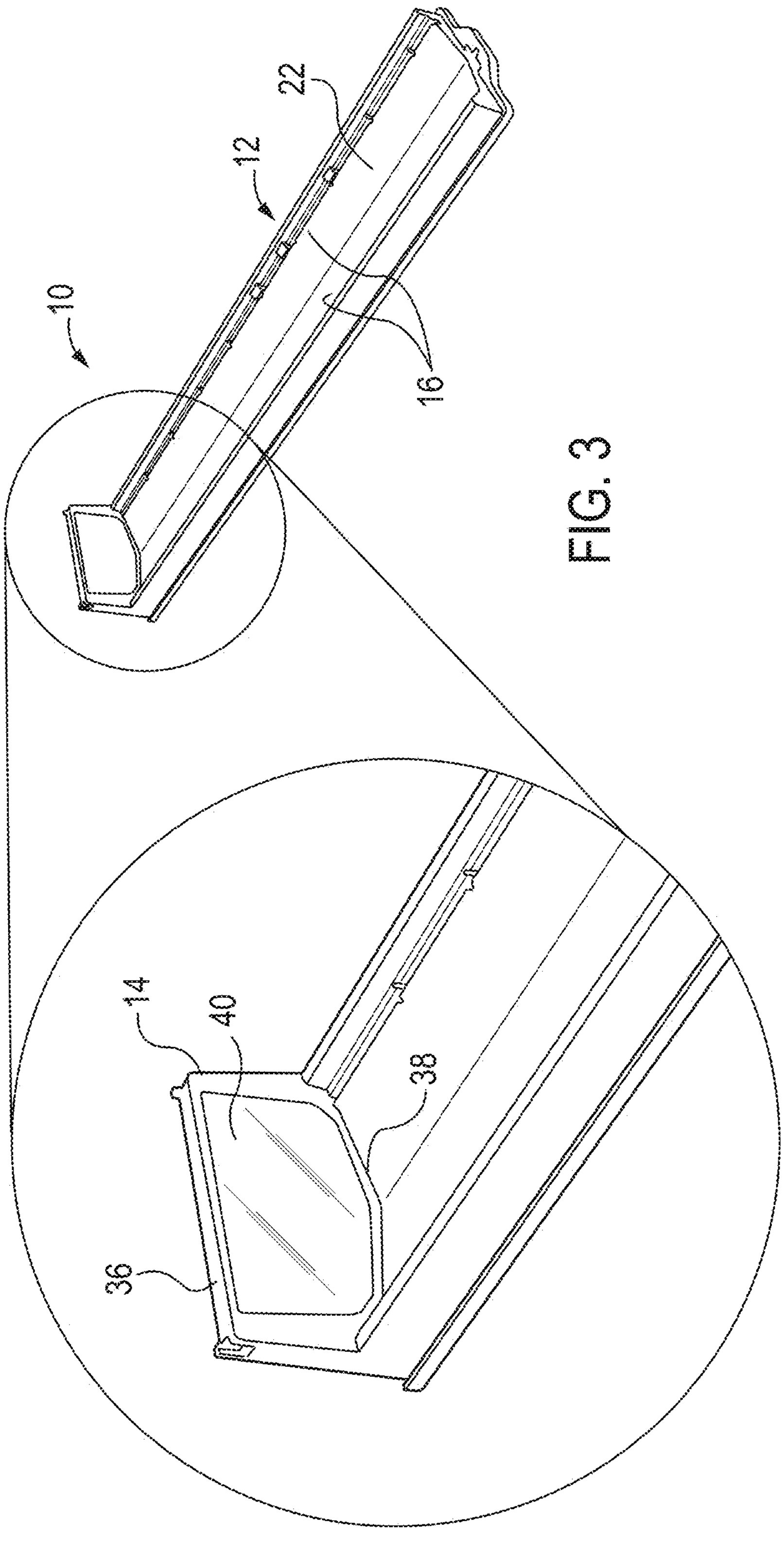
FIG. 3 is a reduced scale top perspective view of a fish measuring device shown in FIG. 1, together with a detail view of the device, shown in relevant part, showing a reference feature in the form of a mirror decal.

With reference to FIG. 1, there is illustrated an embodiment of a fish measuring device 10. The illustrated device 10 comprises an elongated, generally rectangular, V-shaped board 12, a fence 14 and curved, sloped or angularly disposed side supports 16, which, in combination with the V-shaped board, form a cusp shape along the length of the device 10, which provides a cradle for supporting a fish F. For tournament fishing, to facilitate the measurement of a fish for a particular sportsman or competitor, the device may further comprise an identifier, identifying the sportsman or competitor, supported in relation to the board 12, the image of which may be captured, together with a fish F being measured on the board 12. The image may be transmitted to a remote location, where fish measurement data for competitors is collected. Tabs may also be supported in sliding relation to the board 12 for keeping track of fish measurements. The board 12 may further support buoyant material so that the board 12 may float in the event that the device 10 is inadvertently dropped in the water during use. Alternatively, the board 12 may be comprised of a buoyant material, which may be supported beneath the board 12. Such a material may be in the form of a foam sheet adhered to the bottom of the board 12. In additional, the board 12 may comprise an eyelet for attachment of a bungee or other suitable tether for securing the board 12 in relation to an environmental structure to reduce the risk of the board 12 being inadvertently lost, for example, in the water.

The board 12 is preferably rigid and may be formed of plastic, metal or other suitable material. The board 12 carries indicia, which may be in the form of ruled markings and numerals 18, similar to those of a ruler, and which may be laser or machine engraved lines, or molded into the surface of the board, for example, at quarter-inch increments, although it should be understood that other distances of such markings may be suitable for the invention. The indicia may carry a pigment, such as a black pigment, to enable the indicia to be readily seen by a viewer. The fence 14 may be affixed or otherwise supported in relation to the board 12, such as with rivets, dowel pins, screws, or the like, or may be of unitary construction with the board 12, such as by injection molding, and other suitable process. It should be understood that the fence 14 defines a surface, or face 20, that aligns flush and perpendicular with the zero or beginning of the markings 18 on the board 12.

The board 12 may comprise an upper surface 22, which may carry the markings 18, a fence end 24, a distal end spaced apart from or opposite the fence end 24, and right and left sides 28, 30.

The fence 14 may comprise opposing right and left sides 32, 34, an upper surface 36, and a lower ledge 38.

The angularly disposed side supports 16, at least in part, in combination with the board 12, form the cradle of the fish measuring device 10, which provides reliable support for the fish F being measured. The width of the cradle may vary, although it is desirable that the cradle be sufficiently wide for measuring relatively large fish.

The fence 14 includes a reference feature 40 supported on the face 20 of the fence 14 to provide a visual indication that the mouth of a fish F being measured is, in fact, in contact with the face 20. In the illustrated embodiment, the reference feature 40 is a reflective surface (i.e., a mirror surface or decal, or the like). The reference feature 40 may cover the face 20 entirely or sufficiently to provide a surface for engagement of the mouth of a fish F being measured. In the embodiment shown, the reference feature 40 extends from some point proximate to the lower edge 38 to a point proximate the upper surface 36 and has a width that covers at least a medial portion of the face 20, where the mouth of a fish F being measured makes contact.

In use, a fish F being measured is placed on the board 12 with its head facing towards the fence 14. The fish F is slid towards the fence 14 until its mouth touches the face 20 of the fence 14. When the fish F is against that reference feature 40 (e.g., touching or engaging the mirrored surface or decal), the contact point of the fish F with the reference feature 40 will be visually apparent (i.e., there will be no space or gap between the fish F and the reference feature 40). In this case, it will be appreciated that the measurement of the fish F will be true and accurate. When the fish F is not against that reference feature 40 (e.g., not touching or engaging the mirrored surface or decal), it will be apparent from the gap between the fish F and the reference feature 40. In this case, it will be appreciated that the measurement of the fish will not be true and accurate (the measure provided will falsely indicate a length for the fish F that is greater than the actual length of the fish F).

Figure 4:
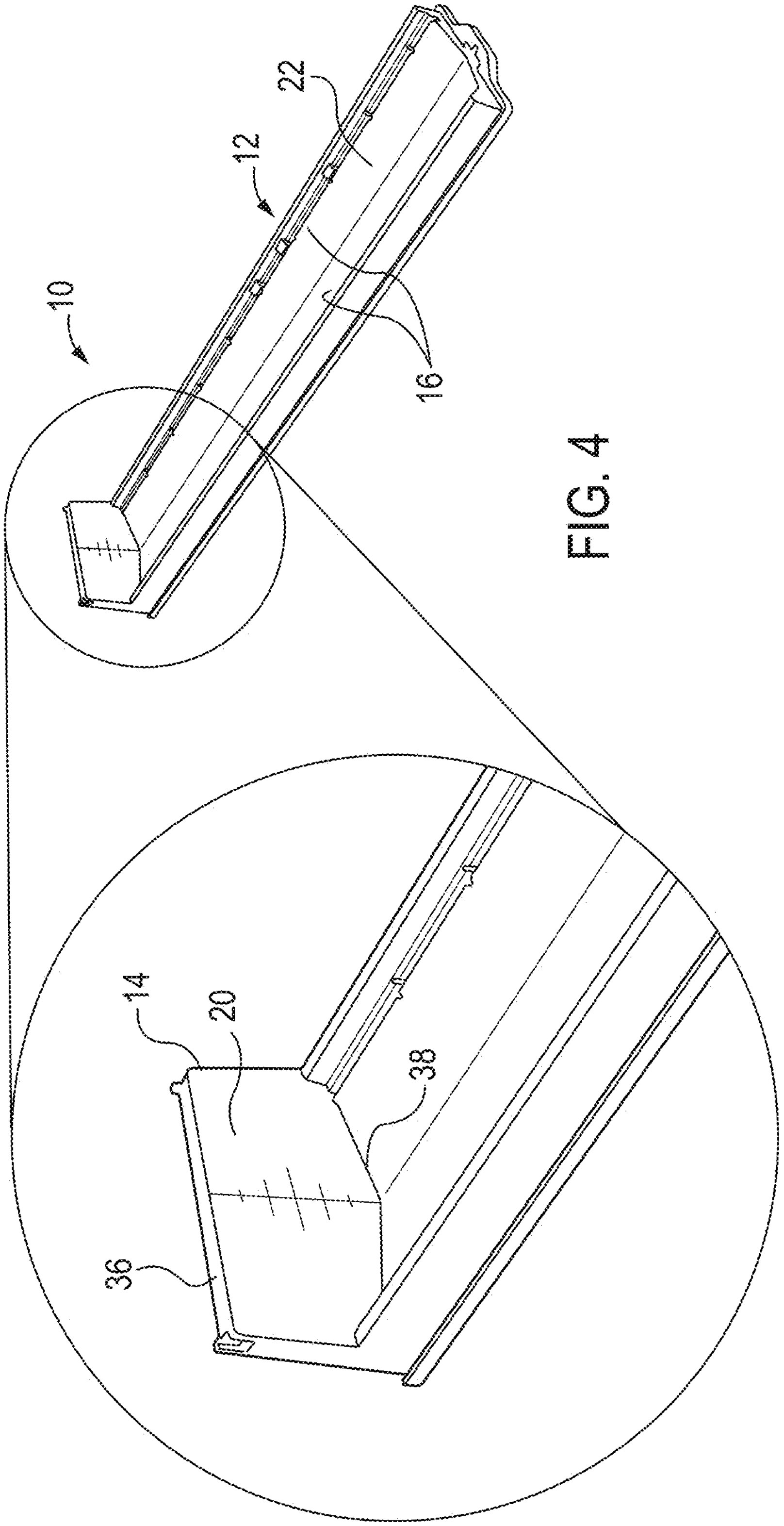
FIG. 4 is a reduced scale top perspective view of an alternative fish measuring device, together with a detail view of the device, shown in relevant part, showing a reference feature in the form of a pattern of lines.

An alternative reference feature may be in the form of a series of vertically spaced, horizontal lines, as shown, for example, in FIG. 4. When the fish F is against that reference feature 40 (e.g., touching the reference feature), the contact point of the fish F with the reference feature 40 will be visually apparent (i.e., horizontal lines beneath the point of contact will not be visible). In this case, it will be appreciated that the measurement of the fish will be true and accurate. When the fish F is not against the reference feature 40 (e.g., not touching or engaging the reference feature 40), it will be apparent from a space or gap between the fish F and the reference feature 40 (i.e., horizontal lines beneath the apparent point of contact will be visible). In this case, it will be appreciated that the measurement of the fish F will not be true and accurate.

It should be appreciated that an image of the fish F on the board 12, complete with the measurement, and evidence of the fish F engaging the reference feature 40, can be captured and transmitted to a remote location in a fishing tournament.

It should be noted that orientational terms used throughout this description are with reference to the orientation of the invention and component parts thereof as presented in the accompanying drawings, which is subject to change. Therefore, orientational terms are used for semantic purposes, and do not limit the invention or its component parts in any particular way.

While the invention and components parts thereof may have been described herein in terms of certain components being referred to in either the singular or the plural, other arrangements are possible. For example, it is to be understood that due to the conceptual description presented herein, components presented in the singular may be provided in the plural, and vice versa.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

10 fish measuring device
12 board
14 fence
16 side supports
18 ruled markings
20 face of fence
22 upper surface of board
24 fence end of board
28 right side of board
30 left side of board
32 right side of fence
34 left side of fence
36 upper surface of fence
38 lower ledge of fence
40 reference feature (mirror surface or decal or horizontal lines)
F fish

What is claimed is:

1. A fish measuring device for measuring fish, the device comprising:

an elongated board for placement of a fish to be measured, the board carrying indica in the form of a scale of measurement for measuring the length of the fish, a fence at one end of the board for engagement of an end of the fish, the fence comprising a face facing in a direction of the board and a reference feature supported by the face, the reference feature being configured to provide an indication that the fish is engaging the fence to ensure an accurate measurement of the fish.

2. The device of claim 1, wherein the board is cusped along a length thereof to form an elongated trench that extends in a lengthwise direction of the board.

3. The device of claim 1, wherein the reference feature comprises a reflective surface, which represents a gap between the fence and the fish when the fish is not in contact with the fence.

4. The device of claim 3, wherein the reflective surface is a mirror surface or decal.

5. The device of claim 1, wherein the reference feature comprises a series of vertically spaced, horizontal lines, which, when the fish is not against the fence, are visible beneath the fish, which represents a gap between the fish and the fence.

* * * * *